(12) United States Patent
Lepere et al.

(10) Patent No.: US 7,233,444 B2
(45) Date of Patent: Jun. 19, 2007

(54) LIGHT DIFFRACTION OPTICAL METHOD, WITH CORRESPONDING OPTICAL SYSTEM AND DEVICE

(75) Inventors: Didier Lepere, Sevres (FR); Erick Jourdain, Bagnolet (FR)

(73) Assignee: Jobin Yvon S.A.S., Longjumeau (FR)

( * ) Notice: Subject to any disclaimer, the term of this patent is extended or adjusted under 35 U.S.C. 154(b) by 67 days.

(21) Appl. No.: 11/065,362

(22) Filed: Feb. 25, 2005

(65) Prior Publication Data

US 2005/0190449 A1    Sep. 1, 2005

Related U.S. Application Data

(63) Continuation of application No. 10/381,050, filed as application No. PCT/FR01/02985 on Sep. 26, 2001, now abandoned.

(30) Foreign Application Priority Data

Sep. 26, 2000   (FR) .................................. 00 12237

(51) Int. Cl.
  *G02B 5/18*   (2006.01)
  *G01J 3/28*   (2006.01)
  *G21K 1/06*   (2006.01)

(52) U.S. Cl. .......................... 359/572; 356/328; 378/84
(58) Field of Classification Search ................ 359/569, 359/572; 378/81, 84; 356/328
See application file for complete search history.

(56) References Cited

U.S. PATENT DOCUMENTS 4,915,463 A    4/1990   Barbee, Jr.
5,719,915 A    2/1998   Koike et al.

FOREIGN PATENT DOCUMENTS

WO    WO 99/35523    7/1999

*Primary Examiner*—Audrey Chang
(74) *Attorney, Agent, or Firm*—Arent Fox LLP

(57) ABSTRACT

An optical system comprises a Bragg reflector configured to diffract incident light having a wavelength between about 0.1 nm and about 0.7 nm. The optical system also comprises a diffraction grating comprising parallel lines engraved on a surface of the Bragg reflector. Specifically, the diffraction grating is configured to diffract incident light having a wavelength between about 0.6 nm and about 150 nm.

14 Claims, 4 Drawing Sheets

LIGHT DIFFRACTION OPTICAL METHOD, WITH CORRESPONDING OPTICAL SYSTEM AND DEVICE

This application claims priority from and is a continuation of U.S. patent application Ser. No. 10/381,050, which was filed on Sep. 11, 2003, now abandoned, which is a National Phase application of International Application No. PCT/FR01/02985, filed Sep. 26, 2001, and is entitled "LIGHT DIFFRACTION OPTICAL METHOD, WITH CORRESPONDING OPTICAL SYSTEM AND DEVICE," the disclosure of which is incorporated herein by reference in its entirety.

FIELD OF THE INVENTION

This invention concerns a light diffraction optical method, as well as corresponding optical system and device.

The range of application of the invention also relates to wavelengths measurements taken on monochromatic luminous beams as well as the dispersion of polychromatic beams, for example in a monochromator.

DESCRIPTION OF THE RELATED ART

The use of diffraction grating for the diffraction of light is well known. Thus, in the vacuum ultraviolet range (wavelengths greater than 0.6 nm) or VUV, an incident beam is sent conventionally under a grazing incidence to a diffraction grating and a returned beam is collected for a given order of diffraction, according to an angle of diffraction complying with the laws of the gratings (diffraction of Fresnel). The gratings used, for example for a synchrotron radiation VUV, are typically engraved in materials such as silicon or SiC CVD, by ionic engraving or rolling.

The wavelength range that may be covered by such gratings is somehow limited internally. Indeed, at constant angle of incidence, the reflectivity decreases as a function of the wavelength. Satisfactory efficiency of diffraction can not thus be easily obtained below 0.6 nm.

For diffractions at lower wavelengths, other systems, such as diffracting crystals, are implemented. In such a crystal, having a given distance between reticular planes, incident beams are diffracted according to the Bragg law. The useful wavelength range is delineated above by the distance between the reticular planes, and it is moreover limited in that the angular range is generally comprised between 5° and 85° for practical reasons. For instance, for an oriented silicon monocrystal (111), for which the double distance between reticular planes is equal to 0.627 nm, the wavelength range varies between 0.055 nm and 0.625 nm.

One may also perform Bragg reflectors by stacking of thin layers on a substrate. They also diffract the light according to the Bragg law. Below, by Bragg reflector is meant a crystal or a stack of layers on a substrate.

Thus, to cover a wavelength range comprised for example between 0.1 nm and 2 nm, it is necessary to use two devices and two implementations completely distinct, one of them enabling to work in the VUV range (diffraction grating) and the other in the X-ray range (diffraction crystal). Still, it appears useful in some cases to work in a range covering both these ranges, for example for a monochromator collecting a synchrotron radiation beam.

SUMMARY OF THE INVENTION

The invention concerns a light diffraction optical method implementing a diffraction grating, enabling to cover an extended spectral range, extending for example from the vacuum ultraviolet to hard X-rays. More accurately, the optical measuring method of the invention enables to take into account wavelengths ranging from 0.1 nm to 20 nm or more, by means of a single device, easily and economically.

The invention also concerns an optical system and an optical measuring device having the advantages aforementioned.

To this end, the invention relates to an optical measuring method wherein:

at least one incident light beam having at least one wavelength is sent onto a surface of an optical system having a normal axis, according to a direction forming an angle of incidence relative to said normal axis, such optical system comprising a Bragg reflector and a grating engraved at the surface of the Bragg reflector, and at least one returned beam is collected by the optical system according to a diffraction direction forming an angle of diffraction with respect to the normal axis, after diffraction of the incident beams by the optical system.

According to the invention, the wavelengths and the angle of incidence of at least one of the incident beams are such that this incident beam is diffracted by the Bragg reflector and/or by the grating.

Thus, the Bragg reflector whereon is engraved the grating, is used directly for the diffracting at low wavelengths.

The method of the invention thus enables to provide a dissociation of the Fresnel diffraction (on the grating) and of the Bragg diffraction (in the Bragg reflector), thereby providing double operation in the VUV range (grating) and in the range of the X-rays (Bragg reflector).

The method of the invention thus enables to simplify considerably the measuring protocol and to provide smaller equipment.

Advantageously, for this incident beam diffracted by the Bragg reflector:

the Bragg reflector is a crystal,
the angle of incidence is comprised between 5° and 80° and/or
the wavelengths are ranged between 0.1 nm and 0.7 nm.

In a preferred embodiment, the crystal is formed of an silicon monocrystal (111) and the grating is directly engraved on this crystal. Such a substrate proves particularly suitable to fulfil the double function of crystal diffraction and of grating diffraction.

The grating is advantageously covered with a metallic layer. The efficiency of the grating is thereby increased.

Preferably, the wavelengths and the angle of incidence of at least another of the incident beams are such that this incident beam is diffracted by the grating.

The double function of the optical system is thereby provided: diffraction by the crystal and diffraction by the grating Advantageously, for this other incident beam diffracted by the grating:

the angle of incidence is at least equal to 70° and/or
the wavelengths of the other incident beam are comprised between 0.6 nm and 150 nm.

In a first implementation of the method, the incident beams are polychromatic luminous beams. Then, advantageously, the method is implemented in a monochromator, the optical system serving as a dispersive element and followed by a selection slit.

In a second implementation of the method, the incident beams are monochromatic luminous beams. The optical system may thus be used as primary calibration means for measuring wavelengths.

The invention also concerns an optical system comprising a Bragg reflector.

According to the invention, it comprises a diffraction grating engraved on the Bragg reflector.

Preferably, the Bragg reflector is a crystal and the crystal is composed of a silicon monocrystal.

This optical system enables to implement the method of the invention.

The invention also relates to an optical measuring device comprising:
- an optical system according to the invention,
- means for irradiating the surface of the optical system by means of at least one incident beam of light,
- means for collecting at least one returned beam by the optical system after diffraction of the incident beams by the optical system, and
- rotary means relative of the optical system with respect to the incident beams.

The invention also applies to the use of the method or of the device according to the invention for primary calibration for measuring wavelengths (monochromatic luminous beam) or for dispersion in a monochromator or spectrograph (polychromatic luminous beam).

BRIEF DESCRIPTION OF THE DRAWINGS

This invention will be understood better and illustrated by means of the following embodiments, without limitation thereto, with reference to the appended drawings whereon.

DETAILED DESCRIPTION OF THE INVENTION

Figure 1:
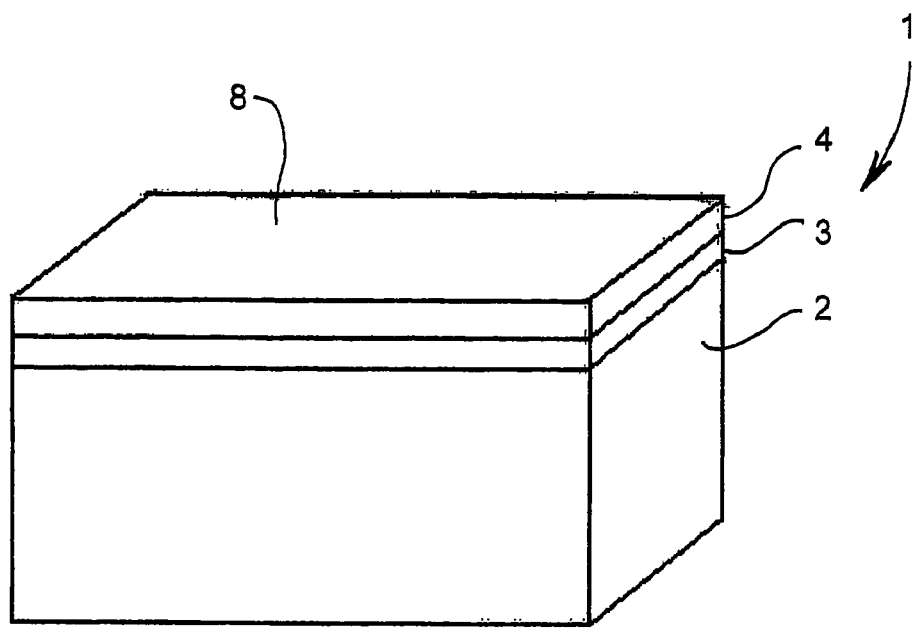
FIG. 1 is a schematic diagram illustrating an optical system used in the method according to the invention (the scales are not respected for better visibility)

An optical system 1 (FIG. 1) comprises a Bragg reflector 2 and a grating 3 engraved on the substrate of the Bragg reflector 2 at a surface 8 of the optical system 1. The grating 3 is covered with a metallic layer 4, for example composed of a layer of 10 nm of gold.

The Bragg reflector 2 is advantageously composed of a silicon monocrystal (111). It is super-polished, with a slope error of a few tens of arc seconds and a roughness of a few Å. This polishing enables the operation of the optical system 1 in grazing reflection, for use in vacuum ultraviolet implementing a diffraction by the grating 3.

In an alternative embodiment, the Bragg reflector 2 is a stack of layers. It may be itself placed on a substrate.

Figure 2:
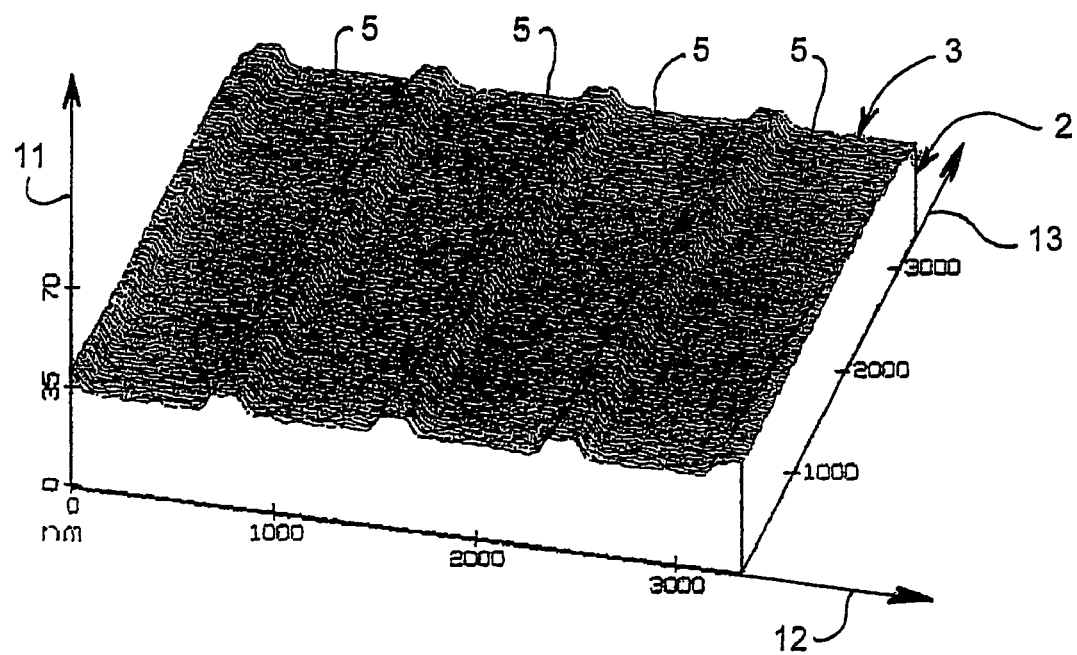
FIG. 2 shows a profile, measured with a scanning tunneling microscope (STM) of a modulation recorded on an optical system used to is implement an optical measuring method according to the invention.

The diffraction grating 3 is for example inscribed by holographic recording and ionic machining. It comprises lines 5 (FIG. 2) whereof the depth is for example smaller than 10 nm, which makes it a very little modulated grating. The profile of the grating 3 can be obtained by scanning tunneling microscopy, in height (depth of engraving), width and length (respectively axes 11, 12 and 13, in nm). The density N of lines of the grating 3 per mm is for example equal to 1200.

For the lines 5, different shapes (sinusoidal, triangular, and square) and different density laws (constant or variable) may be used.

The optical system 1 is used to cover a spectral range from the vacuum ultraviolet to hard X-rays. Thus, according to a first embodiment (FIG. 3), an incident beam 21 is sent, having a wavelength smaller than 0.6 nm on the surface 8. The optical system 1 having a normal axis 20 to the surface 8, the incident beam 21 forms relative to this normal axis, an angle α and with respect to the reticular planes 6 of the Bragg reflector 2 (i.e., in such case, relative to the surface 8), an angle θ. The angle α ranges preferably between 5° and 80°.

Figure 3:
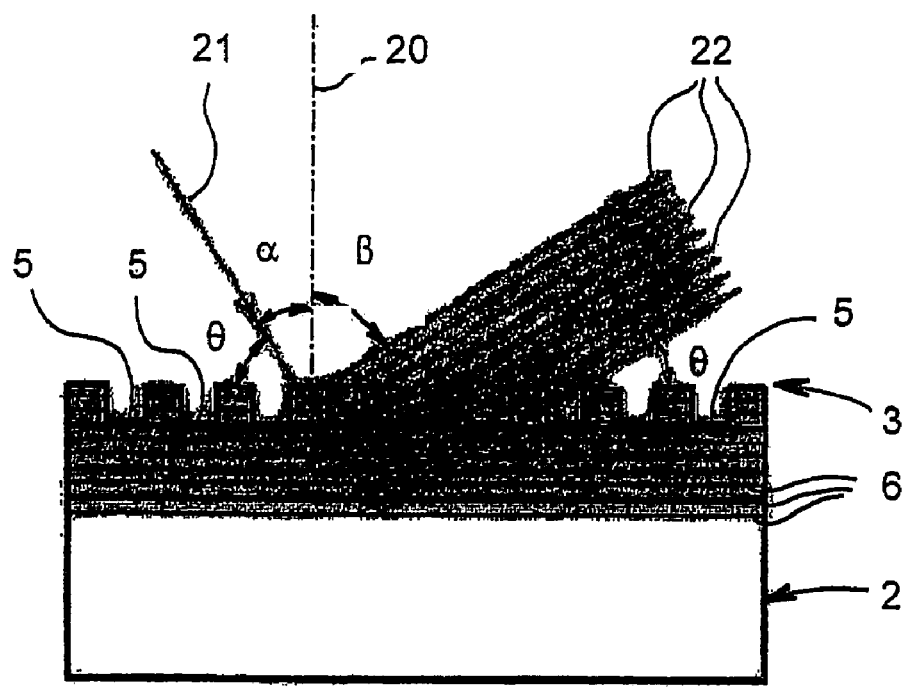
FIG. 3 is a principle diagram of embodiment of the optical measuring method according to the invention in diffraction crystal mode.

The optical system 1 then behaves like a conventional diffraction crystal, the beams diffracted 22 by the Bragg reflector 2 forming with the normal axis 20, an angle β equal to the angle α (FIG. 3). This system 1 may also be used as a wavelength calibration or as a diffracting element of an X-ray monochromator.

The absence of perturbations of the Bragg diffraction in the Bragg reflector 2 by the grating 3 may be explained in that the depth of the lines 5 of the grating is sufficiently small relative to the depth of penetration of the incident beam in the Bragg reflector 2, when such incident beam has wavelengths which are sufficiently small (in particular X-rays).

The spectral range covered is given by the Bragg law:

$$\lambda = 2d \sin \theta$$

d designating the distance between the reticular planes. Consequently, for the Bragg reflector 2 of the example (silicon monocrystal (111)), the double 2d of the distance is equal to 0.627 nm.

Thus, the angle α being comprised between 5° and 80°, the useful wavelengths range extends approximately from 0.1 nm to 0.625 nm.

Good results can also be obtained while using an oriented silicon monocrystal (311).

Figure 4:
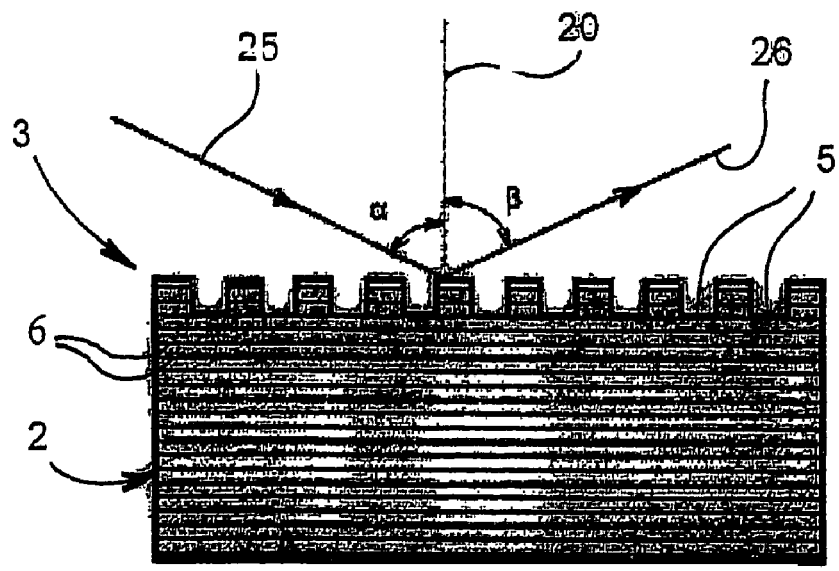
FIG. 4 is a principle diagram of the embodiment of the optical measuring method according to the invention in a mode diffraction grating.

According to a second embodiment, the optical system 1 is caused to operate as a diffraction grating in the vacuum ultraviolet range. Thus, (FIG. 4) an incident beam 25 is sent at a wavelength greater than 0.6 nm. This incident beam 25 forms with the normal axis 20, an angle α enabling to provide high efficiency in the order of diffraction used, advantageously greater than or equal to 70°, so that the incident radiation is quasi a grazing one. High efficiency is thereby maintained. The incident beam 25 then interacts with the diffraction grating 3 and generates diffracted beams 26 forming angles β with the normal axis 20, such angles of diffraction β depending on the order of diffraction considered (the diffracted beam 26 represented on FIG. 4 corresponds for example to the order −1).

The correct behaviour of the optical system 1 has been checked for both operating modes, respectively in Bragg diffraction and in Fresnel diffraction. For the tests performed, the density of lines 5 by mm is equal to 1200 and the depth of the lines 5 is equal to 7.2 nm.

Figure 5:
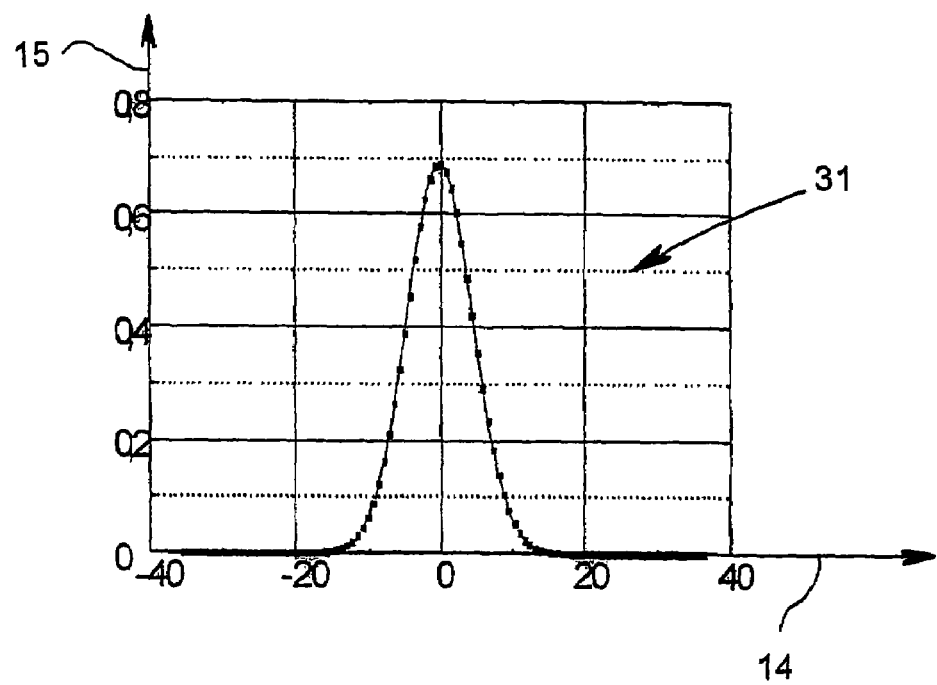
FIG. 5 represents for the optical system of FIG. 2 and in diffraction crystal mode, the reflectivity as a function of the difference of the angle of incidence to the angle of Bragg for a wavelength equal to 0.154 nm.

Thus, the response of the optical system 1 has been tested for a fixed wavelength (0.154 nm) as a function of the incidence angle on an X-ray tube with a goniometer θ–2θ. In such an arrangement, when the angle of incidence varies by Δθ, the detector is rotated by 2Δθ, in order to comply with the law of Bragg. On FIG. 5, as a function of the difference of the incidence angle to the Bragg angle (given by the law of Bragg, axis 14, in arc-seconds), the reflectivity is carried forward for the wavelength of 0.154 nm. It can be noted that the curve 31 obtained has a width at half the maximum (FWHM) smaller than 20 arc-seconds, whereas the result is equivalent to that obtained with conventional silicon crystals. This validates the use of the optical system 1 in the X-ray range.

In order to test the operating mode in diffraction grating, two monochromatic beams 25 have been sent in succession at two distinct wavelengths. For each of them, the efficiency of the grating 3 was measured in the order −1 and +1 as a function of the angle of incidence α. Moreover, k designating the order of diffraction, λ representing the wavelength and N being the number of lines 5 per mm of the grating 3, the detector was placed at such at an angle that the law of the gratings is complied with:

$$\sin \alpha + \sin \beta = k\, N\, \lambda.$$

Figure 6:
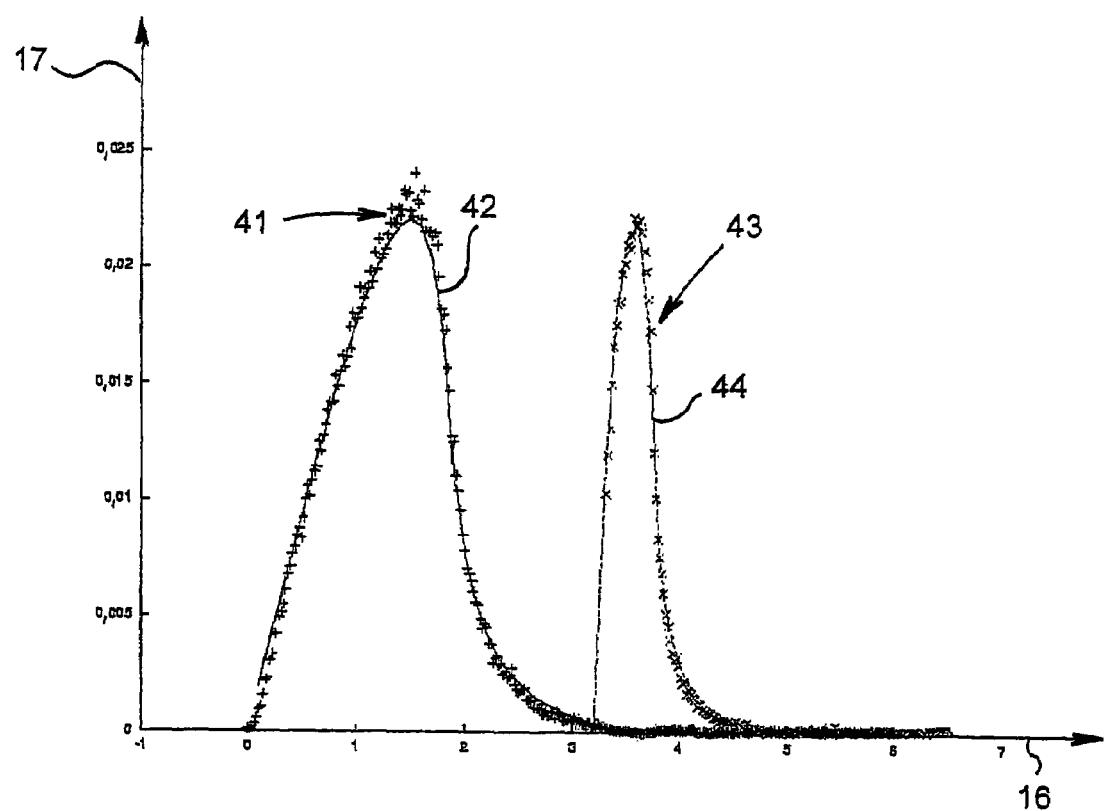
FIG. 6 represents for the optical system of FIG. 2 and in diffraction grating mode, the efficiency as a function of the incidence angle for the orders 1 and −1, for a wavelength equal to 1.33 nm.
Figure 7:
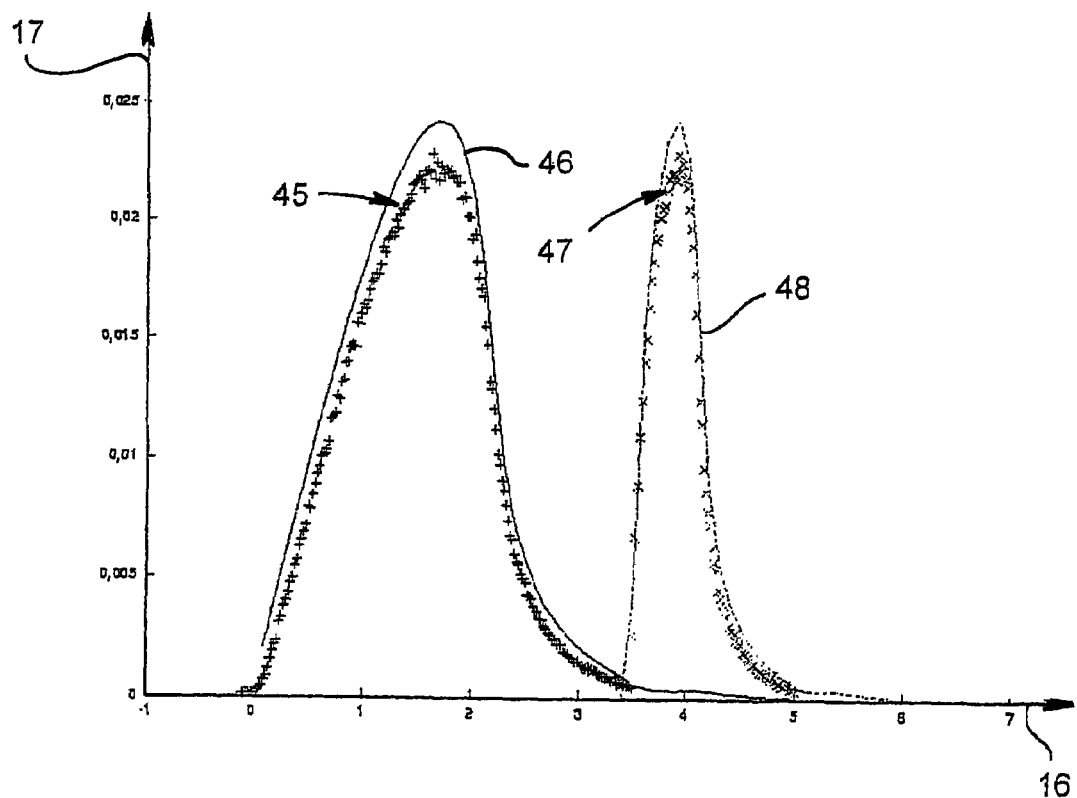
FIG. 7 represents for the optical system of FIG. 2 and in diffraction grating mode, the efficiency as a function of the angle of incidence for the orders 1 and −1, for a wavelength equal to 1.55 nm.

For the wavelength of 1.33 nm (FIG. 6), the efficiency is represented (i.e. the ratio of the intensity of the flux of the diffracted beam 26 to the intensity of the flux of the incident beam 25, axis 17) as a function of the angle of incidence (axis 16, in degrees). For the orders −1 and 1, respectively sets of points 41 and 43 are obtained. They are compared respectively to theoretical curves 42 and 44 calculated on the basis of the parameters of the grating 3, derived from the measurements realised with the scanning tunneling microscope. Similarly, for a wavelength of 1.55 nm (FIG. 7), respectively sets of points 45 and 47 are plotted as well as the corresponding theoretical curves 46 and 48 for the diffraction orders −1 and +1.

It can be observed that the measurements obtained are very close to the theoretical curves, which validates the operation of the optical system 1 in diffraction grating mode, the latter diffracting the radiation with notable efficiency.

Figure 8:
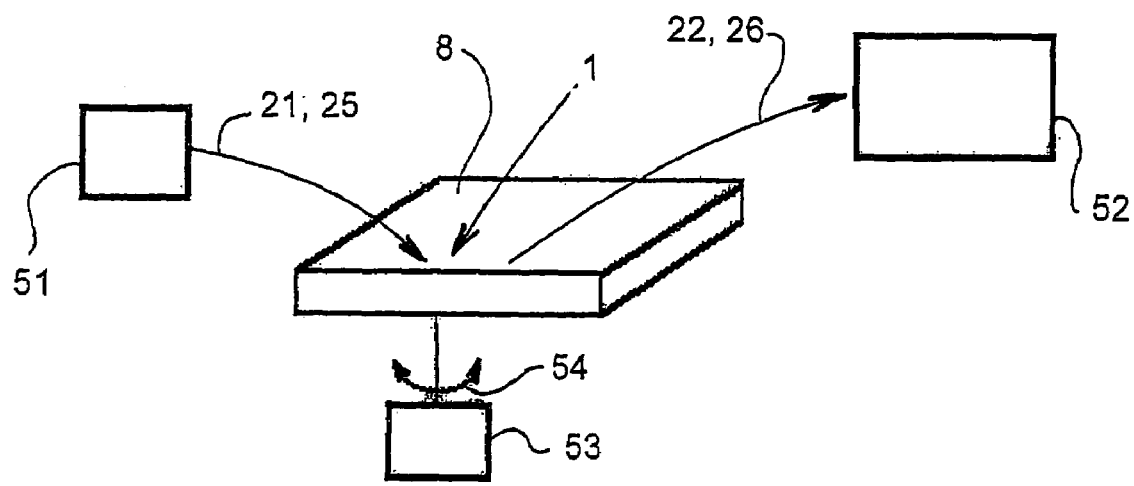
FIG. 8 shows an optical measuring device used to implement an optical measuring method according to the invention.

One may also use the optical system 1 in an optical measuring device (FIG. 8) comprising means for irradiating 51 the surface 8 of the optical system 1 and means for collecting 52 beams returned by the optical system 1 after diffraction of the incident beams. Such device also comprises rotary means 53 relative to the optical system with respect to the incident beams, acting on the optical system 1 and/or on the orientation of the incident beams 21 or 25, in order to produce relative rotation 54.

For instance, with the irradiating means 51, a monochromatic luminous beam is emitted and thanks to the rotary means 53, the optical system 1 is oriented with respect to the incident beam in crystal diffraction mode (angle of incidence α comprised between 5° and 80°) or in grating diffraction mode (angle of incidence α advantageously greater than or equal to 70°), according to the range to which belongs the wavelength of the beam processed. One then proceeds conventionally in crystal operation or in grating operation with the collection means 52.

In another example, the irradiating means 51 are the output of a synchrotron producing a polychromatic energy beam, and the optical system 1 as well as the collection means 52 are used as a monochromator. The collection means 52 comprise notably a slit for selecting wavelengths. The device is then implemented in grating diffraction mode or in crystal diffraction mode, according to the wavelength(s) studied.

The invention claimed is:

1. An optical system, comprising:
    a Bragg reflector configured to diffract incident light having a wavelength between about 0.1 nm and about 0.7 nm; and
    a diffraction grating comprising parallel lines engraved on a surface of the Bragg reflector, wherein the diffraction grating is configured to diffract incident light having a wavelength between about 0.6 nm and about 150 nm.

2. The optical system of claim 1, wherein the Bragg reflector comprises a crystal.

3. The optical system of claim 2, wherein the crystal comprises a silicon monocrystal.

4. The optical system of claim 2, further comprising a metallic layer which covers the diffraction grating.

5. The optical system of claim 1, further comprising a metallic layer which covers the diffraction grating.

6. An optical measuring device, comprising: an optical system, comprising:
    a Bragg reflector configured to diffract incident light having a wavelength between about 0.1 nm and about 0.7 nm; and
    a diffraction grating comprising parallel lines engraved on a surface of the Bragg reflector, wherein the diffraction grating is configured to diffract incident light having a wavelength between about 0.6 nm and about 150 nm;
    means for emitting at least one incident light beam toward the surface of the diffraction grating, the at least one incident light beam having a wavelength between about 0.1 nm and about 150 nm;
    means for collecting at least one returned light beam from the surface of the optical system; and
    means for rotating the optical system with respect to the at least one incident light beam so that the returned light beam results from the diffraction of the at least one incident light beam by the optical system.

7. The optical measuring device of claim 6, wherein the Bragg reflector comprises a crystal.

8. The optical measuring device of claim 7, wherein the crystal comprises a silicon monocrystal.

9. The optical measuring device of claim 7, wherein the optical system further comprises a metallic layer which covers the diffraction grating.

10. The optical measuring device of claim 6, wherein the optical system further comprises a metallic layer which covers the diffraction grating.

11. The optical measuring device of claim 6, wherein the means emitting emits a polychromatic light.

12. A light diffraction optical method using an optical measuring device, wherein the optical medical device comprises: an optical system, comprising: a Bragg reflector configured to diffract incident light having a wavelength between about 0.1 nm and about 0.7 nm; and a diffraction grating comprising parallel lines engraved on a surface of the Bragg reflector, wherein the surface of the Bragg reflector defines a normal axis, and the diffraction grating is configured to diffract incident light having a wavelength between about 0.6 nm and about 150 nm; means for emitting at least one incident light beam toward a surface of the diffraction grating, the at least one incident light beam having a wavelength between about 0.1 nm and about 150 nm; means for collecting at least one returned light beam from the surface of the optical system; and means for rotating the optical system with respect to the at least one incident light beam so that the returned light beam results from the diffraction of the at least one incident light beam by the optical system, the method comprising the steps of:

emitting the at least one incident light beam in a direction of incidence forming an angle of incidence relative to the normal axis; and collecting the at least one returned beam from the optical system in a returned direction forming a return angle with respect to the normal axis.

13. The method of claim 12, wherein the angle of incidence is between about 5° and about 80° when the wavelength of the at least one incident light beam is between about 0.1 nm and about 0.7 nm, and wherein the angle of incidence is at least about 70° when the wavelength of the at least one incident light beam is between about 0.6 nm and about 150 nm.

14. An optical system, comprising:

a Bragg reflector configured to diffract incident light having a wavelength between 0.1 nm and 0.6 nm; and a diffraction grating comprising parallel lines engraved on a surface of the Bragg reflector, wherein the diffraction grating is configured to diffract incident light having a wavelength that is greater than 0.6 nm and is less than or equal to about 150 nm.

* * * * *